3,560,518
AROMATIC-POLY(NITRILE CARBONATES)
Emmett H. Burk, Jr., Glenwood, Ill., and Donald D. Carlos, Crown Point, Ind., assignors to Sinclair Research, Inc., New York, N.Y.
No Drawing. Continuation-in-part of application Ser. No. 659,618, Aug. 10, 1967, which is a continuation-in-part of application Ser. No. 502,450, Oct. 22, 1965. This application Mar. 18, 1968, Ser. No. 714,003
Int. Cl. C07d 85/06
U.S. Cl. 260—307                                                6 Claims

ABSTRACT OF THE DISCLOSURE

There are disclosed compounds of the formula:

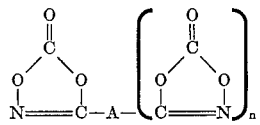

wherein $n$ is an integer of 1 to 3 and A is aromatic hydrocarbon of up to about 30 carbon atoms and of 2 to 3 monocyclic aromatic rings or one fused bicyclic aromatic ring or one fused tricyclic aromatic ring. The compounds can be made by reacting the corresponding hydroxamic acids and phosgene. The compounds are useful as, inter alia, aromatic polyisocyanate generators and have the advantage over conventional aromatic polyisocyanates in that they can be easily handled and stored.

---

This application is a continuation-in-part of abandoned application Ser. No. 659,618, filed Aug. 10, 1967, which in turn is a continuation-in-part of abandoned application Ser. No. 502,450, filed Oct. 22, 1965.

The present invention is directed to a new class of organic compounds. More specifically, the invention is directed to aromatic poly(nitrile carbonates), including di(nitrile carbonates), which can be represented by the following structure:

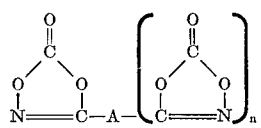

wherein $n$ is an integer of 1 to 3, preferably 1 to 2. A in the above structure is an aromatic hydrocarbon radical of 2 to 3 monocyclic aromatic rings or one fused bicyclic aromatic ring or one fused tricyclic aromatic ring and contains a total of up to about 30 carbon atoms. For instance, A can be tetrahydronaphthyl, naphthyl, anthracyl, diphenyl, phenylbenzenyl, phenyl naphthyl, diphenyl alkylene, and the like. A can contain as a substituent on the aromatic ring, for instance, one or more halogen, e.g., chloro, bromo or fluoro, nitro, alkyl or alkoxy groups, which alkyl and alkoxy groups contain about 1 to 20, preferably 1 to about 10, carbon atoms. At least two of the nitrile groups of the compounds of the present invention are attached to aromatic rings of the aromatic hydrocarbon A, and the nitrile carbonate groups may be attached to the same or different aromatic rings of aromatic hydrocarbon A. Since the compounds of the invention can be decomposed to polyisocyanates $$A(NCO)_n$$

the A group in the above structure contains no hydrogen reactive with isocyanate.

The aromatic poly(nitrile carbonates) of the present invention, are valuable intermediates or precursors for the preparation of highly desired chemicals. For example, as mentioned above, the poly(nitrile carbonates) can be thermally decomposed to polyisocyanates. Polyisocyanates, such as diisocyanates, have found extensive use in the preparation of high molecular weight polymers by reaction of the polyisocyanates with polymerizable organic compounds such as compounds with terminally active hydroxy and amine groups. Polyurethanes, for instance, are commonly prepared by the reaction of diisocyanates and polybasic alcohols such as the glycols.

The aromatic poly(nitrile carbonates) can also be acid hydrolyzed to aromatic hydroxamic acids.

Decomposition of the aromatic poly(nitrile carbonate) to the corresponding aromatic polyisocyanates can be effected by simply heating the aromatic poly(nitrile carbonates), either in the presence or absence of catalyst, to a temperature below the degradation point of the desired aromatic polyisocyanate product. Degradation may be evidenced by conversion to organic by-products, and the extent of degradation at elevated temperatures can be a function of the time the product is held at such temperatures. Thus degradation can be a time-temperature relationship, the latter being controlled to prevent undue degradation of the desired product. Since the decomposition reaction is exothermic there is a tendency for the reaction temperature to run away. Means for carrying away or absorbing heat should be used, therefore, to control the temperature below the degradation point of the desired aromatic polyisocyanate product. The heating temperature employed will vary, of course, depending upon the decomposition temperature of the feed and degradation temperature of the particular aromatic polyisocyanates being prepared. Thus, for example, decomposition temperatures as high as about 325° C. or higher may be required. Frequently, however, decomposition temperatures will fall in the range of about 50 to 200° C., or even as low as about 75 to 150° C.

Advantageously, the decomposition is conducted in the presence of an inert solvent such as benzene, xylenes, toluene, chlorobenzene, polyphenyl ethers, and the like, the solvent serving as a heat sink and preventing the formation of hot spots in the decomposition zone. Where relatively high decomposition temperatures are required, so that problems of product degradation are posed, isocyanate yields can be enhanced by removing the isocyanate product from the decomposition zone as soon as it is formed. This may be accomplished, for example, by conducting the decomposition at reduced pressures and in the presence of a high boiling, inert solvent and effecting flash vaporization and overhead collection of the isocyanate product. Such flash vaporization can be accomplished, for instance, by gradually adding the aromatic poly(nitrile carbonate), preferably as a solution in an inert solvent, to the surface of a pool, or heel, of the high boiling solvent which is maintained at decomposition temperatures. Continuous removal and collection of the flash vapors of isocyanate product can be by known methods and with known equipment.

The ability of the aromatic poly(nitrile carbonates) of the invention to generate polyisocyanates upon heating provides an additional advantage to the consumer in that the aromatic poly(nitrile carbonates) of the invention, in contrast to isocyanates, are stable in the absence of water and therefore can be easily handled and stored. Also, since there is no active hydrogen (e.g. in the form of HCl) present in the aromatic poly(nitrile carbonates) of the invention or in the decomposition products formed, to react with the isocyanate when the latter is made, use of the aromatic poly(nitrile carbonates) for the production of polyisocyanates provides a method that does not suffer from the reduced yields and separation and purification problems presented by the by-products obtained from starting materials of commercial methods wherein active hydrogen is present. Use of the aromatic poly(nitrile carbonates) in the preparation of isocyanates, furthermore, provides a process having advantages over commercial methods employing azides in that the former do not have the explosion tendencies of the latter and are more economical.

The aromatic poly(nitrile carbonates) of the invention can be prepared by reacting an aromatic polyhydroxamic acid and phosgene. Aromatic polyhydroxamic acids which react with phosgene to produce the novel compounds of the invention can be represented by the structure:

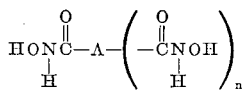

wherein A and $n$ are as defined above in the structure of the aromatic poly(nitrile carbonate) of the invention and preferably wherein the hydroxamic acid groups, if present on the same aromatic ring, are in a nonortho-position with respect to each other. The aromatic polyhydroxamic acid reactants include, for instance, naphthopolyhydroxamic acids, anthropolyhydroxamic acids, phenylbenzopolyhydroxamic acids, phenylnaphthopolyhydroxamic acids, diphenylalkylenepolyhydroxamic acids, and the like.

Illustrative of aromatic polyhydroxamic acids suitable for use as the reactant in the preparation of the aromatic poly(nitrile carbonates) of the invention are the following: polycyclic-aromatic polyhydroxamic acids, such as 1 - benzyl-2,4-benzodihydroxamic acid; 2,8-naphthodihydroxamic acid; 1,3,5-naphthotrihydroxamic acid; 3-chloro - 4,6-tetrahydronaphthalodihydroxamic acid; 2,2-bis(p-phenylhydroxamic acid) propane; bis(p-phenyl hydroxamic acid) methane, 2,8-anthracenedihydroxamic acid; 1,5 - dinitro-3,7-naphthalodihydroxamic acid; 1,4-dimethyl-5,8-anthracenedihydroxamic acid; 1-bromo-4,7-phenanthrenedihydroxamic acid; 4,4'-biphenyldihydroxamic acid; 2,2'-biphenyldihydroxamic acid; 4,4'-diphenylethanedihydroxamic acid; 2,2' - diphenylethanedihydroxamic acid; 4,4'-stilbenedihydroxamic acid; 2,2'-stilbenedihydroxamic acid, etc.

Illustrative examples of aromatic poly(nitrile carbonates) of the invention include 2,8-di(nitrile carbonate) naphthalene; 1,3,5-tri(nitrile carbonate) naphthalene; 1, 3,5-tri(nitrile carbonate) naphthalene; 1,3-di(nitrile carbonate) tetrahydronaphthalene; 2,2-bis[p-di(nitrile carbonate) phenyl] propane; bis[p-di(nitrile carbonate) phenyl] methane; 2,8-di(nitrile carbonate) anthracene; 2,5,8-tri(nitrile carbonate) anthracene; 4,4'-biphenyl-di (nitrile carbonate); 2,2'-biphenyl-di(nitrile carbonate); 4, 4'-diphenyl ethane di(nitrile carbonate); 2,2'-diphenyl ethane-di(nitrile carbonate); 4,4'-stilbene-di(nitrile carbonate); 2,2'-stilbene-di(nitrile carbonate), etc.

The temperature for effecting the reaction of the aromatic hydroxamic acid and phosgene may vary depending upon the particular aromatic hydroxamic acid selected but in all cases should be conducted below the decomposition temperature of the desired aromatic nitrile carbonate. Reflux temperatures can also be used as long as the reflux temperature of the particular mixture is below the decomposition temperature of the corresponding aromatic nitrile carbonate produced. The reaction temperature will often fall in the range of up to about 90° C., preferably up to about 50° C. The reaction has been successfully run at temperatures as low as about minus 30° C. Ordinarily the reaction will proceed readily at atmospheric pressure but sub- and super-atmospheric pressure can be employed if desired.

Either the polyhydroxamic acid reactant or the phosgene reactant can be in excess but it is preferred that at least a stoichiometric amount of phosgene be used, that is, a ratio of at least one mole of phosgene per hydroxamic acid substituent. A large excess of phosgene is particularly preferred.

The reaction is conducted in the liquid phase and in many cases the aromatic poly(hydroxamic acid) will react from the solid state. Advantageously, the aromatic poly(hydroxamic acid) is first dissolved or slurried in an oxygen-containing organic solvent. Illustrative of suitable oxygen-containing solvents are the phosgene reactant itself and normally liquid organic ethers, esters, furans, dioxanes and the like. The preferred solvent is the phosgene reactant, an excess of which in most cases, will readily dissolve the aromatic poly(hydroxamic acid).

The reaction is often over less than about 0.5 hour, for example, 15 minutes, or in about 5 to 20 hours, depending upon the reaction temperature employed, and is marked by a cessation in hydrogen chloride gas evolution. Normally at least about 0.5 hours is required for the reaction to go to completion at temperatures which minimize side reactions. The reaction is usually quite rapid once the aromatic poly(hydroxamic acid) is dissolved. At the lower reaction temperatures the aromatic poly(hydroxamic acid) is generally slow to dissolve and may even come out of solution, go back into solution, etc. during the reaction.

The aromatic nitrile carbonate can be recovered from the resulting solution by any desirable means, for instance, by first filtering the resulting solution to remove any unreacted starting materials and subjecting the filtrate to reduced pressure to remove unreacted phosgene and inert solvent, if employed, and provide the aromatic nitrile carbonate as a crude product. Alternately, prior to the filtering step, the solution can be cooled to crystallize out the product and recovered as described. The crude product can be either crystalline or liquid depending on the particular aromatic poly(nitrile carbonate) prepared. A purer product can be obtained by recrystallization techniques as, for instance, from a suitable solvent such as dichloromethane, carbon disulfide, ethyl acetate, thionyl chloride and the like, or mixtures thereof.

The following examples will serve to illustrate the present invention but are not to be construed as limiting.

EXAMPLE I

To a 500 cc. round bottom flask equipped with a reflux condenser attached to a CaCl$_2$ drying tube, is added 24.6 g. (0.100 mole) of 1,4-naphthodihydroxamic acid and 200 cc. of ether. The mixture is stirred mechanically at room temperature for about three hours during which time 49.5 g. (0.500 mole) of phosgene is introduced. The resulting solution is filtered and the solvents removed under reduced pressure. There is obtained a white solid, 1,4-naphthodi(nitrile carbonate).

EXAMPLE II

Similarly, 29.6 g. (0.100 mole) of 9,10-anthrodihydroxamic acid is treated with 49.5 g. (0.500 mole) of phosgene to give 9,10-anthrodi(nitrile carbonate).

EXAMPLE III

In like manner, 28.6 g. (0.100 mole) of bis(p-phenyl hydroxamic acid)methane is treated with 49.5 g. (0.500 mole) of phosgene to give bis[p-di(nitrile carbonate) phenyl]methane.

It is claimed:
1. The compounds having the structure:

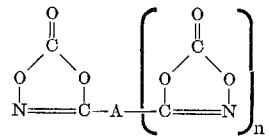

wherein $n$ is an integer of 1 to 3 and A is aromatic hydrocarbon of up to 30 carbon atoms having 2 to 3 monocyclic aromatic rings or one fused bicyclic aromatic ring or one fused tricyclic aromatic ring, said aromatic hydrocarbon being optionally substituted by one or two halo or nitro substituents.

2. The compounds of claim 1 wherein $n$ is 1 and A is naphthyl.

3. The compounds of claim 1 wherein $n$ is 1 and A is anthracyl.

4. 1,4-naphthodi(nitrile carbonate).

5. 9,10-anthrodi(nitrile carbonate).

6. Bis[p-di(nitrile carbonte) phenyl]methane.

References Cited

Beck, Berichte, 84 (1951), 688–9.

ALEX MAZEL, Primary Examiner

R. J. GALLAGHER, Assistant Examiner

U.S. Cl. X.R.

260—240, 454, 500.5